United States Patent Office 3,578,392
Patented May 11, 1971

3,578,392
MOLYBDENUM PURIFICATION PROCESS
Joseph E. Ritsko, Towanda, Pa., assignor to Sylvania Electric Products Inc.
No Drawing. Filed June 30, 1969, Ser. No. 837,940
Int. Cl. C22b *59/00;* C01g *39/00*
U.S. Cl. 23—22    4 Claims

ABSTRACT OF THE DISCLOSURE

The process, wherein an aqueous molybdenyl sulfate feed solution is formed from sulfuric acid and an impure molybdenum source and is contacted with an organic extractant phase to selectively extract molybdenum into the organic phase and thereafter the molybdenum values are recovered by using an aqueous ammonium stripping agent to contact the molybdenum-containing organic solution, is improved by adding the steps of (1) forming a molybdenyl sulfate solution containing a molybdenum concentration of from about 120 to about 180 grams/liter $MoO_3$ basis; (2) filtering the molybdenyl sulfate solution to remove undissolved impurities; (3) maintaining the temperature of the molybdenyl sulfate feed solution at from about 70° C. to about 90° C. for about 3 hours, thereby forming a high purity solid molybdenum trioxide and (4) separating the solid molybdenum trioxide from the aqueous feed solution that now has a reduced molybdenum concentration but is suitable as the aqueous feed solution to the organic extraction step.

BACKGROUND OF THE INVENTION

This invention relates to the production of high purity molybdenum from an impure molybdenum source material. More particularly it relates to an improvement to a solvent extraction process wherein an organic extractant solution is used to selectively extract molybdenum from an impure aqueous molybdenyl sulfate feed solution and a purified ammonium molybdate solution is stripped from the organic extractant solution.

Obtaining pure molybdenum that is needed for most metallurgical uses from impure molybdenum has heretofore been a time consuming and difficult process. As is discussed in co-pending patent applications S.N. 837,894 and S.N. 837,777, filed concurrently herewith, certain new solvent extractant processes overcome many of the problems heretofore encountered in producing a highly pure molybdenum in a form suitable for processing for metallurgical uses.

While these processes overcome many of the problems heretofore encountered, it is believed that an improvement of one of the processes that enables the separation of a portion of the molybdenum values contained in the molybdenyl sulfate solution, in a highly pure form before the extraction stage, is an advancement in the art.

SUMMARY OF THE INVENTION

In accordance with one aspect of this invention, it has been discovered that a highly purified molybdenum trioxide can be separated from the acidic aqueous molybdenyl sulfate solution by forming a molybdenal sulfate solution having a concentration of about 120 to about 180 grams/liter, filtering the aqueous molybdenal sulfate solution to remove undissolved impurities, maintaining the temperature of the molybdenyl sulfate solution at from about 70° C. to about 90° C. for a period of 3 hours, thereby forming solid molybdenum trioxide, and separating the solid molydbenum trioxide from the aqueous molybdenyl sulfate solution that has a resulting lower molybdenum concentration but is suitable as the feed solution to the organic extractant step.

For a better understanding of the present invention, together with other and further objects, advantages and capabilities thereof, reference is made to the following disclosure and appended claims in connection with the above description of one of the aspects of this invention.

DESCRIPTION OF THE PREFERRED EMBODIMENTS

In the practice of this invention, an impure molybdenum such as technical grade $MoO_3$ is dissolved in a concentrated sulfuric acid solution. A high concentration (about 700–800 grams/liter) of molybdenum is usually achieved by holding a temperature of about 250°–260° C. for about 2 to 4 hours. Thereafter, the concentrated acid-molybdenum solution is diluted to attain a concentration of about 120 to about 180 grams/liter $MoO_3$ basis. Although a slightly higher or lower concentration can be utilized, such as low as 100 grams/liter, or as high as 200 grams/liter, the efficieny is lowered and the maximum benefits of the improvement are not achieved. Lower concentrations of molybdenum result in more of the available molybdenum having to be processed through the solvent extraction process. Higher concentrations of molybdenum can result in filtration problems. After the foregoing feed solution has the proper $MoO_3$ concentration, the solution is filtered to remove insolubles such as silica. At this point, the solution is generally about 40° C. After the filtration, the solution is heated to a temperature of from about 70° C. to about 90° C. The foregoing temperature is maintained for at least about 3 hours to thereby cause the formation of insoluble or solid molybdenum trioxide. The molybdenum trioxide is separated from the acidic aqueous solution of molybdenyl sulfate and that solution is the feed to the extraction step of the purification process. The solid $MoO_3$ is highly pure, that is about 99.5% pure as compared to technical grade $MoO_3$ that is about 80–85% pure.

A molybdenum oxide hydrate is believed to be formed because after drying at about 100° C. the material contains about 9% water and 91% $MoO_3$, indicating that the solids are probably a mixture of anhydrous $MoO_3$ and $MoO_3 \cdot H_2O$ or $MoO_3 \cdot 2H_2O$.

The pH of the molybdenyl sulfate solution after filtration and before the heating to from about 70° C. to about 90° C. is from about 0.4 to about 1.2. Some pH change results as the molybdenum oxide precipitates out of solution. It is believed that the control of the combination of proper concentration of molybdenum, temperature, length of heating and pH enables the highly pure molybdenum trioxide to be formed. It is believed to be unexpected that a highly pure material would be separated for several reasons. For example, numerous impurities are present that under similar conditions of one or more of the variables could conceivably precipitate along with the molybdenum trioxide. Additionally, molybdenum trioxide is soluble in sulfuric acid as is shown by the original digestion step. Furthermore, it is to be noted that even though the molybdenyl sulfate solution is at a lower temperature prior to the maintaining of the solution at from about 70° C. to about 90° C., no precipitate is formed.

To more fully illustrate the invention, the following detailed example is presented. All parts, proportions and percentages are by weight unless otherwise indicated.

Example I

About 275 parts of technical grade molybdenum oxide containing about 82% $MoO_3$ and the remainder various impurities such as iron, copper, silica, aluminum, calcium, chromium and manganese are added with agitation to about 550 parts of 93% sulfuric acid. The mixture is maintained at from about 250° C. to 260° C. for about 2 hours. Sufficient deionized water is added to the mixture to attain a specific gravity of the solution of about 1.30. The concentration of molybdenum in the solution is measured at about 180 g./liter/MoO$_3$ basis and the pH is about 0.4 to about 1.2. The solution is filtered to remove insolubles, chiefly silicates. The filtered solution is heated to about 90° C. for about 3 hours and a solid material is formed. The solid material is separated from the acidic aqueous material that has a molybdenum concentration of about 50 g./liter. The solid material is washed with water and an analysis of a sample of the washed material indicates impurities of less than 0.5%. The material is dried at 100° C. and a sample indicates the presence of about 9% water and the remainder essentially pure MoO$_3$. The bulk density of the material is about 5.5 g./cubic inch and an average particle size of from about 0.8 to about 1.5 microns. The solid material after drying would appear to have the following empirical formula:

$$MoO_3 \cdot 0.67H_2O$$

thus indicating a mixture of MoO$_3$ and MoO$_3 \cdot XH_2O$. The solid material can be converted by standard techniques to a highly pure molybdenum powder.

While there has been shown and described what is at present considered the preferred embodiments of the invention, it will be obvious to those skilled in the art that various changes and modifications may be made therein without departing from the scope of the invention as defined by the appended claims.

I claim:
1. In a process wherein an impure molybdate source is purified by forming an aqueous acidic feed solution containing molybdenyl sulfate, contacting said feed solution with an organic extractant phase comprising a tertiary alkyl amine on a water-insoluble hydrocarbon solvent thereby selectively extracting the molybdenum values into said organic phase, stripping the organic solution with an aqueous strip solution containing ammonium ions to thereby form an aqueous ammonium molybdate solution and separating said molybdate solution from said organic solution, the improvement comprising:
 (a) forming a molybdenyl sulfate solution containing a molybdenum concentration of from about 120 grams to about 180 grams/liter, MoO$_3$ basis;
 (b) filtering said solution to remove insolubles;
 (c) maintaining the temperature of said filtered solution at from about 70° C. to about 90° C. for a period of about 3 hours thereby forming a high purity solid molybdenum trioxide; and
 (d) separating said solid molybdenum trioxide from said aqueous feed solution having a reduced molybdenum concentration.

2. The improvement according to claim 1 wherein said aqueous feed solution having a reduced molybdenum concentration is contacted with an organic extractant solution.

3. The improvement according to claim 2 wherein the specific gravity of the molybdenyl sulfate solution is at least about 1.25 g./cc.

4. The improvement according to claim 3 wherein the pH of said solution is from about 0.4 to about 1.2.

References Cited
UNITED STATES PATENTS

| | | | |
|---|---|---|---|
| 3,223,476 | 12/1965 | Hart | 23—19 |
| 3,357,821 | 12/1967 | Henrickson | 23—(312ME) |
| 3,450,639 | 6/1969 | Maria et al. | 23—312(ME) |
| 3,455,677 | 7/1969 | Litz | 23—24X |
| 3,458,277 | 7/1969 | Platzhe et al. | 23—22 |

HERBERT T. CARTER, Primary Examiner

U.S. Cl. X.R.

23—23, 24, 51, 117, 140, 312